F. G. PRICE.
APPARATUS FOR CONSOLIDATING GRANULAR SUBSTANCES IN MOLDS OR OTHER RECEPTACLES.
APPLICATION FILED SEPT. 1, 1920.

1,387,175.

Patented Aug. 9, 1921.
2 SHEETS—SHEET 1.

Frank George Price,
Inventor.

Pennie, Davis, Marvin & Edmonds,
Attorneys.

F. G. PRICE.
APPARATUS FOR CONSOLIDATING GRANULAR SUBSTANCES IN MOLDS OR OTHER RECEPTACLES.
APPLICATION FILED SEPT. 1, 1920.

1,387,175.

Patented Aug. 9, 1921.
2 SHEETS—SHEET 2.

UNITED STATES PATENT OFFICE.

FRANK GEORGE PRICE, OF SCOTSTOUN, GLASGOW, SCOTLAND.

APPARATUS FOR CONSOLIDATING GRANULAR SUBSTANCES IN MOLDS OR OTHER RECEPTACLES.

1,387,175. Specification of Letters Patent. Patented Aug. 9, 1921.

Application filed September 1, 1920. Serial No. 407,490.

*To all whom it may concern:*

Be it known that I, FRANK GEORGE PRICE, a subject of the King of the United Kingdom of Great Britain and Ireland, and residing at Scotstoun, Glasgow, Scotland, have invented a certain new and useful Improvement in Apparatus for Consolidating Granular Substances in Molds or other Receptacles, of which the following is a specification.

This invention relates to apparatus suitable for instance for consolidating in molds or other receptacles granular and other substances or mixtures such as plastic concrete, for example, by means of vibration alone or vibration coupled with light pressure.

The principal object of the invention is to provide simple means for imparting a high frequency vibratory tapping or hammering action in one, two or more directions to the mold or other receptacle carrying the material to be consolidated, for example.

Figure 1:
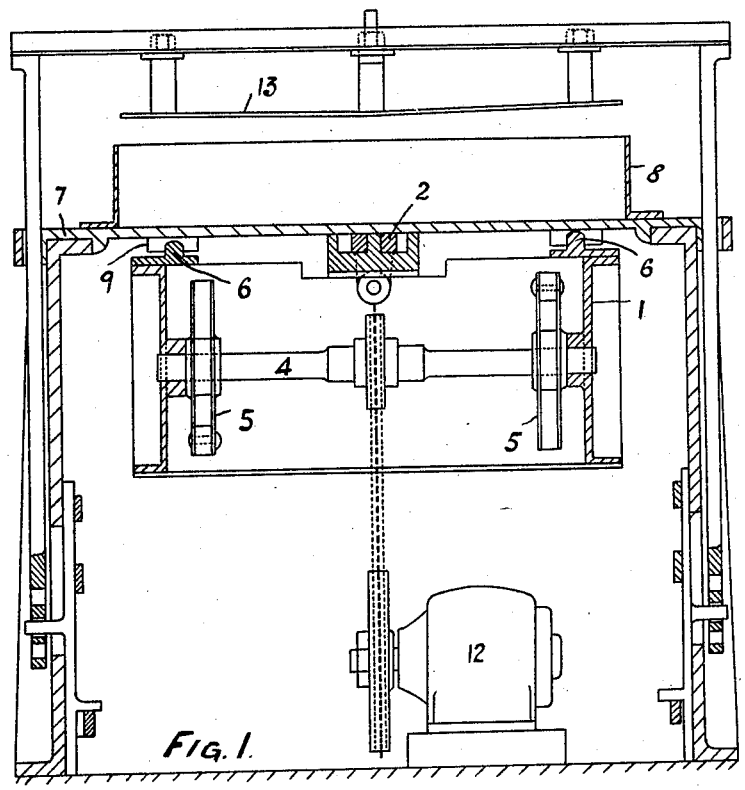
Figure 2:
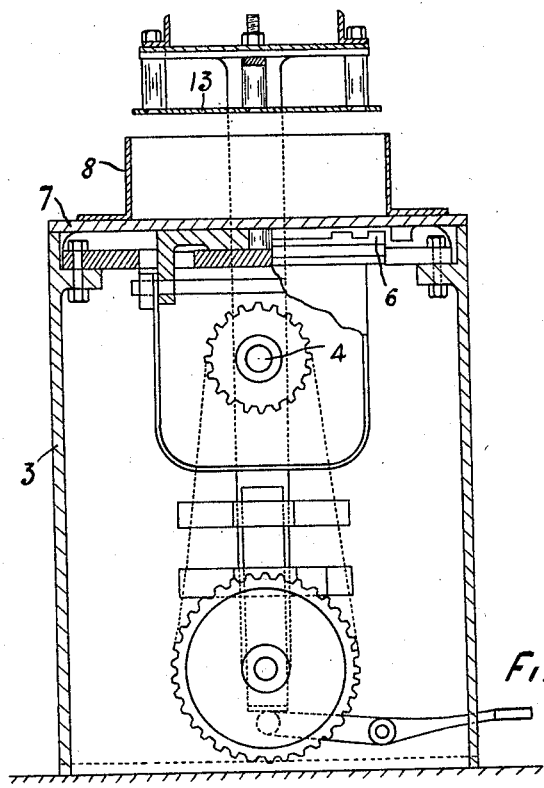

In the drawings Figures 1 and 2 are vertical sections at right angles to each other.

Apparatus constructed in accordance with the invention comprises a bearing member or frame 1 pivoted as by means of a universal joint 2 to a structure 3 in such wise that the bearing member 1 is free to oscillate in one, two or more directions (in the present instance two main directions) and within predetermined limits. The bearing member 1 is provided with journals in which a rotatable shaft 4 or shafts is or are mounted and to which is or are fixed one or more eccentrically loaded disks or wheels 5 (in the present instance two disks) in such manner that on rotation of the shaft or shafts a vibratory motion is imparted to the bearing member 1, whereby tapping members 6 carried by the bearing member 1 are caused to impact the plate or carrier 7 carrying the mold 8 and also, if desired, stops 9 carried by the plate 7. The plate 7 is free to vibrate with high frequency.

The horizontally disposed shaft 4 is driven by chain and sprocket gearing or otherwise from a motor 12, the arrangement being such as to effect vertical oscillatory movements and horizontal oscillatory movements of the mold 8. There may be employed, however, a plurality of shafts or the shaft may be disposed otherwise than horizontally. The shaft 4 with disks 5 constitutes an unbalanced rotor which may be journaled in or on the bearing member.

Alternatively the bearing member may be solid with the mold, and the mold arranged to impact stationary stops.

The mold or receptacle which is preferably of sufficient depth to hold the greater bulk of loose material is filled or partially filled and a top-plate or diaphragm 13 shaped to fit is placed in the mold so as to bear on the material with the object of preventing excessive displacement of, and exercising a light pressure on the material and at the same time producing a level surface. The top-plate or diaphragm is preferably slightly convexed downwardly and may be embossed or otherwise prepared to ornament or shape the surface of the material on which it bears. When the process of consolidation has reached the desired extent, the vibration is discontinued and the top-plate 13 is then removed and the consolidated material disposed of.

I claim:—

1. Apparatus for consolidating granular and other material comprising a carrier for the material to be consolidated, a bearing member having freedom for movement in directions transverse to one another and so disposed relatively to said carrier as by its movement to produce a tapping action on the carrier, and an unbalanced rotor rotatable relatively to said bearing member.

2. Apparatus for consolidating granular and other material comprising a carrier for the material to be consolidated, a bearing member having freedom for movement in directions transverse to one another and adapted on its movement to tap the carrier, and an unbalanced rotor journaled in said bearing member.

3. Apparatus for consolidating granular and other material comprising a carrier for the material to be consolidated, a bearing member having freedom for movement in directions transverse to one another and adapted on its movement to tap the carrier, an unbalanced rotor journaled in said bearing member and means for applying light pressure to the material.

4. Apparatus for consolidating granular and other material comprising a carrier for the material to be consolidated, a bearing member having freedom for movement in directions transverse to one another and adapted when moved to tap the carrier, a shaft journaled for rotation in said bearing member and disks fixed to the opposite ends of said shaft, said disks each loaded by an eccentric weight, the weights being disposed diametrically opposite one another.

In testimony whereof I have signed my name to this specification in the presence of two subscribing witnesses.

FRANK GEORGE PRICE.

Witnesses:
 KATE FOTHERINGHAM,
 ISABEL ROLLO.